(12) United States Patent
Cho et al.

(10) Patent No.: US 11,052,840 B2
(45) Date of Patent: Jul. 6, 2021

(54) GROMMET FOR WIRE HARNESS

(71) Applicants: Hyundai Motor Company, Seoul (KR); Kia Motors Corporation, Seoul (KR); THN Corporation, Daegu (KR); YURA CORPORATION CO., LTD., Seongnam-si (KR); Kyungshin Corp., Incheon (KR)

(72) Inventors: Sung Woo Cho, Suwon-si (KR); Cheol Hun Lee, Suwon-si (KR); Seong Yun Yeo, Seongnam-si (KR); Hang Tae Kim, Anyang-si (KR); Tae Hoon Kim, Siheung-si (KR); Gil Woo Jung, Suwon-si (KR)

(73) Assignees: Hyundai Motor Company, Seoul (KR); Kia Motors Corporation, Seoul (KR); THN Corooration, Daegu (KR); Yura Corporation Co., Ltd., Seongnam-si (KR); Kyungshin Corp., Incheon (KR)

( * ) Notice: Subject to any disclaimer, the term of this patent is extended or adjusted under 35 U.S.C. 154(b) by 0 days.

(21) Appl. No.: 16/882,196

(22) Filed: May 22, 2020

(65) Prior Publication Data
US 2021/0138980 A1    May 13, 2021

(30) Foreign Application Priority Data
Nov. 12, 2019    (KR) .......................... 10-2019-0144598

(51) Int. Cl.
*B60R 16/00*    (2006.01)
*B60R 16/02*    (2006.01)

(52) U.S. Cl.
CPC ................................ *B60R 16/0222* (2013.01)

(58) Field of Classification Search
CPC .................................................. B60R 16/0222
See application file for complete search history.

(56) References Cited

U.S. PATENT DOCUMENTS

| 6,442,794 B2* | 9/2002 | Uchida | B60R 16/0222 16/2.1 |
| 8,502,079 B2* | 8/2013 | Shitamichi | B60R 16/0222 174/152 G |
| 2017/0179703 A1* | 6/2017 | Kominato | H02G 3/22 |

FOREIGN PATENT DOCUMENTS

| KR | 20120048298 A | 5/2012 |
| KR | 101320002 B1 | 10/2013 |
| KR | 101551956 B1 | 9/2015 |

OTHER PUBLICATIONS

KR101320002 B1 English Translation (Year: 2013).*

* cited by examiner

*Primary Examiner* — Pete T Lee
(74) *Attorney, Agent, or Firm* — Slater Matsil, LLP (57) ABSTRACT

A wire harness grommet is provided. The wire harness grommet includes a main body including a first body, a second body connected to the first body, and an inner wall located between the first body and the second body, an inner tube disposed in a center of the main body wherein the inner tube is configured to receive a wire harness, and a plurality of sound insulation projections on the main body, wherein each sound insulation projection has a tapered reflective surface.

20 Claims, 7 Drawing Sheets

GROMMET FOR WIRE HARNESS

CROSS-REFERENCE TO RELATED APPLICATIONS

This application claims priority to Korean Patent Application No. 10-2019-0144598, filed in the Korean Intellectual Property Office on Nov. 12, 2019, which application is hereby incorporated herein by reference.

TECHNICAL FIELD

The present disclosure relates to a grommet for a wire harness.

BACKGROUND

In general, a grommet may be used to protect a wire harness passing through a hole of a panel. The grommet may be fitted into the hole of the panel, thereby protecting the wire harness and preventing the entry of foreign objects, moisture, etc.

For example, a passenger compartment of a vehicle may be separated from an engine compartment by a panel such as a dash panel. The panel may have a hole through which the wire harness passes, and the grommet may be inserted into the hole. The wire harness may be protected by the grommet which prevents the entry of foreign objects, moisture, etc. into the engine compartment. The grommet may be made of a rubber material to ensure water tightness and sound insulation with respect to the hole.

As a conventional grommet has a cavity therein, noise, vibration, and the like in the engine compartment may be transmitted to the passenger compartment through the grommet, which lowers the vehicle's quality.

In order to prevent noise and vibration from entering the passenger compartment of the vehicle through the cavity of the grommet, there has been proposed a method of filling the cavity of the grommet with a sponge, a filler, etc. However, this method may increase the manufacturing cost and reduce productivity.

The above information described in this background section is provided to assist in understanding the background of the inventive concept, and may include any technical concept which is not considered as prior art that is already known to those skilled in the art.

SUMMARY

Embodiments of the present disclosure can solve the above-mentioned problems occurring in the prior art while advantages achieved by the prior art are maintained intact.

The present disclosure relates to a grommet for a wire harness. An embodiment of the present disclosure provides a grommet for a wire harness that is capable of improving water tightness and sound insulation.

According to an embodiment of the present disclosure, a wire harness grommet may include a main body including a first body, a second body connected to the first body, and an inner wall located between the first body and the second body, and an inner tube disposed in the center of the main body and having a passage into which a wire harness is inserted. The main body may have a plurality of sound insulation projections, and each sound insulation projection may have a tapered reflective surface.

The main body may have a groove fitted with a hole of a panel, and the panel may be divided into a first area and a second area. The first body may face the first area, and the second body may face the second area. The plurality of sound insulation projections may be exposed to the second area.

The plurality of sound insulation projections may protrude from the second body toward the second area.

The wire harness grommet may further include a first cavity communicating with the first area and a second cavity communicating with the second area.

The wire harness grommet may further include a plurality of first fingers extending from the inner wall toward the first cavity in a cantilevered manner.

The inner wall may be connected to the inner tube through a connection web.

The wire harness grommet may further include a plurality of second fingers extending from the connection web toward the first cavity in a cantilevered manner.

The wire harness grommet may further include a first outer tube extending from the first body, wherein the first outer tube may be spaced apart from the inner tube in a radial direction so that a first radial spacing may be defined between the first outer tube and the inner tube, and the first cavity may directly communicate with the first radial spacing.

The wire harness grommet may further include a second outer tube extending from the second body, wherein the second outer tube may be spaced apart from the inner tube in a radial direction so that a second radial spacing may be defined between the second outer tube and the inner tube, and the second cavity may directly communicate with the second radial spacing.

The first body may have a tapered wall facing the first area.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
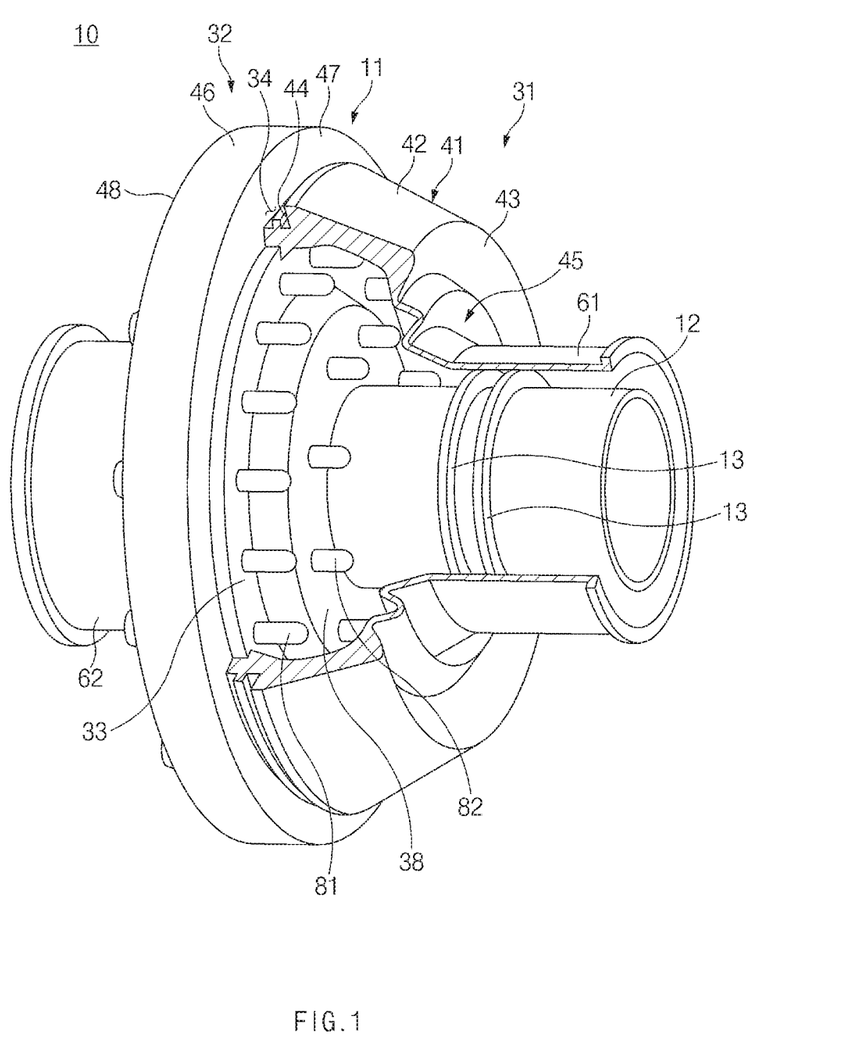
FIG. 1 illustrates a cut-away perspective view of a wire harness grommet according to an exemplary embodiment of the present disclosure.
Figure 2:
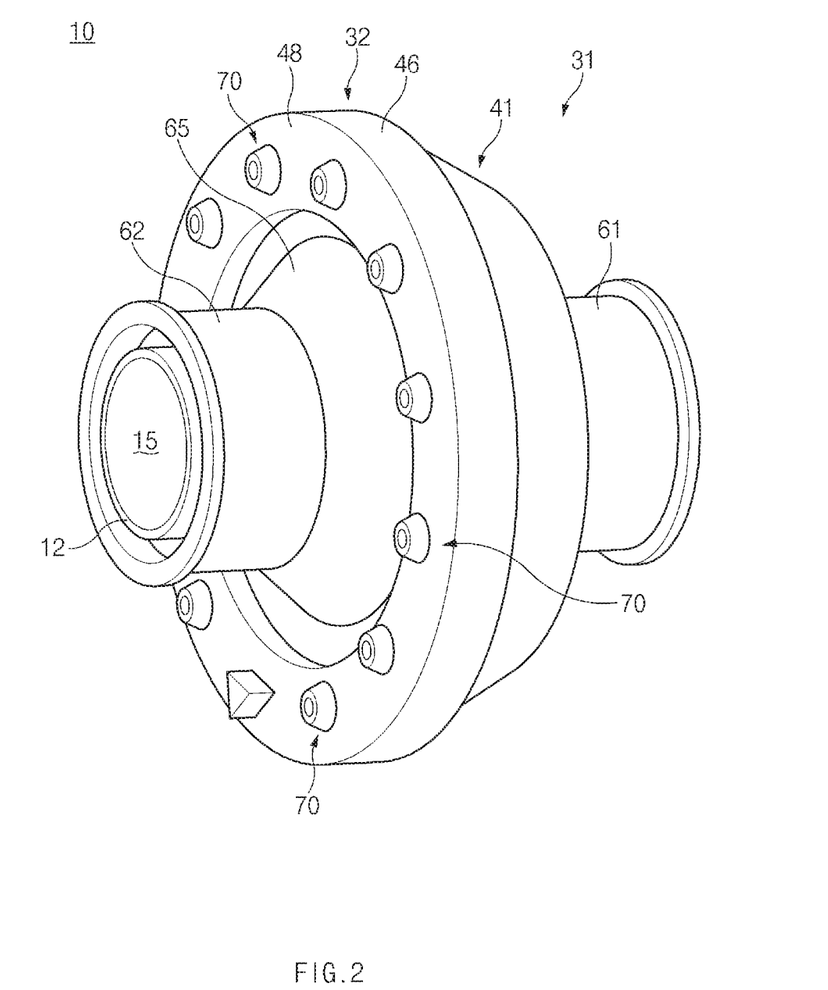
FIG. 2 illustrates a perspective view of a wire harness grommet according to an exemplary embodiment of the present disclosure.

Referring to FIGS. 1 and 2, a wire harness grommet 10, according to an exemplary embodiment of the present disclosure, may include a main body 11 and an inner tube 12 disposed in the center of the main body 11.

The wire harness grommet 10 may be made of a rubber material. As illustrated in FIGS. 1 and 2, the main body 11 may have an annular shape.

Figure 4:
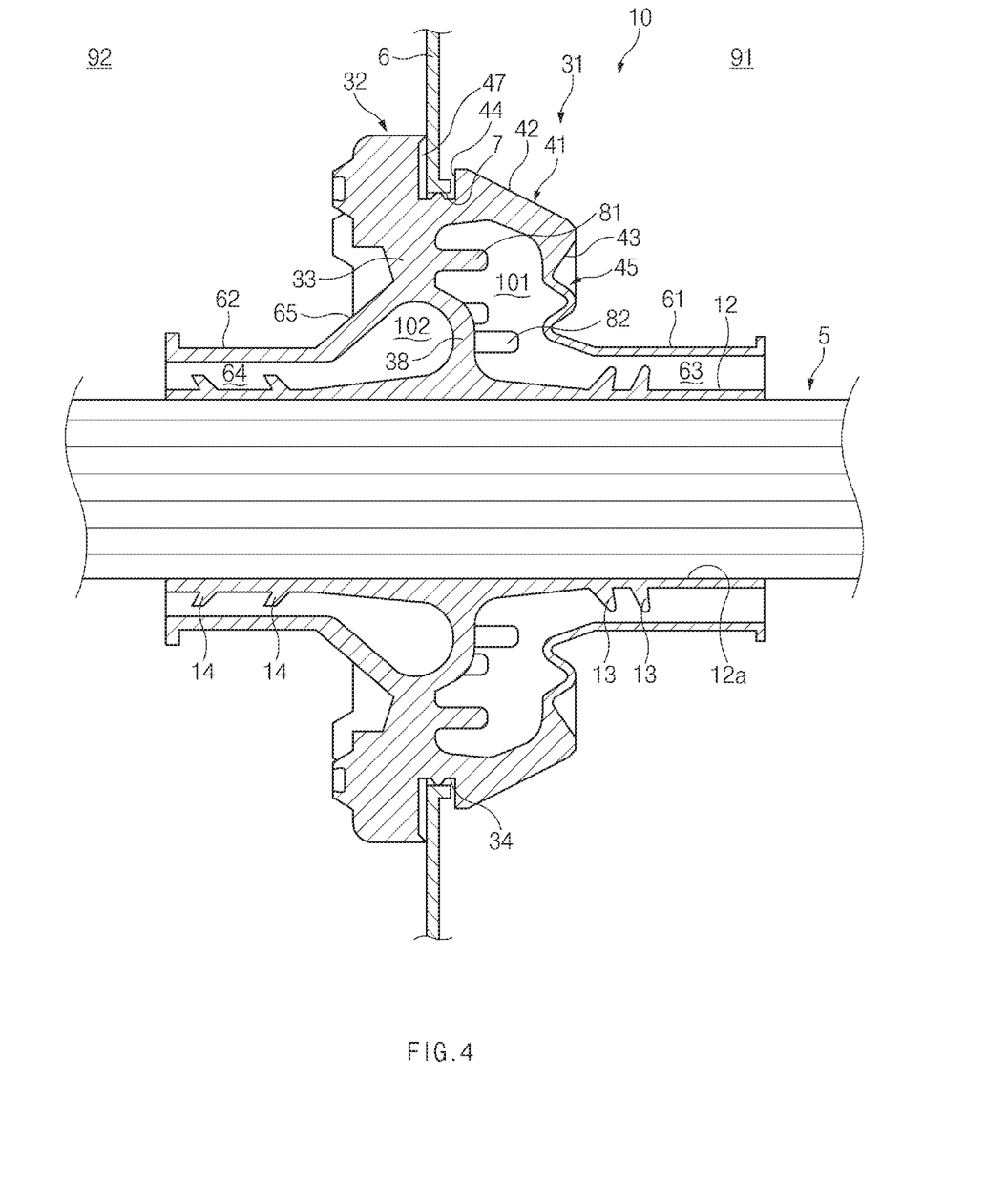
FIG. 4 illustrates a structure in which the wire harness grommet of FIG. 3 is mounted in a panel.

Referring to FIG. 4, a wire harness 5 may pass through a hole 7 of a panel 6, the wire harness grommet 10 may be mounted in the hole 7 of the panel 6, and the wire harness 5 may pass through the wire harness grommet 10. For example, the wire harness 5 may be tightly fitted into the wire harness grommet 10 so that the wire harness grommet 10 may safely protect the wire harness 5.

The wire harness grommet 10 may be fitted into the hole 7 of the panel 6, and the panel 6 may be divided into a first area 91 and a second area 92. For example, the panel 6 may be a dash panel separating an engine compartment of the vehicle and a passenger compartment of the vehicle, the first area 91 may be the passenger compartment of the vehicle, and the second area 92 may be the engine compartment of the vehicle.

The main body 11 may include a first body 31 facing the first area 91 and a second body 32 facing the second area 92, and the first body 31 and the second body 32 may be divided by a groove 34.

The main body 11 may include an inner wall 33, and the inner wall 33 may be located between the first body 31 and the second body 32. The inner wall 33 may extend vertically from the interior side of the main body 11.

The first body 31 may have a tapered wall 41 facing the first area 91, and a corrugated wall 45 connected to the tapered wall 41.

The tapered wall 41 may have a tapered surface 42 inclined at a predetermined angle, a first side surface 43 facing the first area 91, and a second side surface 44 facing the panel 6. The first side surface 43 may extend obliquely from a first end of the tapered surface 42, and the second side surface 44 may extend vertically from a second end of the tapered surface 42. The main body 11 may be easily inserted into the hole 7 of the panel 6 through the tapered wall 41.

A first outer tube 61 may extend from the main body 11 toward the first area 91, and the first outer tube 61 may be spaced apart from the inner tube 12 in a radial direction so that a first radial spacing 63 may be defined between the first outer tube 61 and the inner tube 12. The first outer tube 61 may extend from the corrugated wall 45 of the first body 31 toward the first area 91.

An outer peripheral edge of the corrugated wall 45 may be integrally connected to the first side surface 43 of the tapered wall 41, and an inner peripheral edge of the corrugated wall 45 may be integrally connected to the first outer tube 61. The corrugated wall 45 may integrally connect the tapered wall 41 of the first body 31 and the first outer tube 61. Here, the inner peripheral edge of the corrugated wall 45 may be an edge toward the center of the wire harness grommet 10, and the outer peripheral edge of the corrugated wall 45 may be an edge far from the center of the wire harness grommet 10.

The second body 32 may have an outer peripheral surface 46, a first side surface 47 facing the first area 91, and a second side surface 48 facing the second area 92.

The second side surface 48 may be an exposed surface which is directly exposed to the second area 92, so that sound may be directly transmitted from the second area 92 to the second side surface 48.

A second outer tube 62 may extend from the main body 11 toward the second area 92, and the second outer tube 62 may be spaced apart from the inner tube 12 in a radial direction so that a second radial spacing 64 may be defined between the second outer tube 62 and the inner tube 12. The second outer tube 62 may be connected to the inner wall 33 of the main body 11 through a bulge portion 65, and the bulge portion 65 may be tapered from the second outer tube 62 toward the inner wall 33 of the main body 11.

The main body 11 may have the groove 34 fitted with the hole 7 of the panel 6, and the groove 34 may be located between the first body 31 and the second body 32. The groove 34 may be defined between the second side surface 44 of the tapered wall 41 of the first body 31 and the first side surface 47 of the second body 32. The groove 34 may have a bottom surface 35 extending in a circumferential direction of the main body 11. A lip portion 36 may protrude outward from the bottom surface 35 of the groove 34, and the lip portion 36 may extend in the circumferential direction of the main body 11. As the lip portion 36 is elastically deformed between the hole 7 of the panel 6 and the groove 34, the lip portion 36 may tightly seal the hole 7 and the groove 34.

The inner tube 12 may be integrally connected to the main body 11 through a connection web 38, and the connection web 38 may connect the inner wall 33 of the main body 11 and the inner tube 12. The inner tube 12 may have a passage 15 defined by an inner surface 12a thereof, and the wire harness 5 may be inserted into the passage 15 of the inner tube 12.

According to an exemplary embodiment, an inner diameter of the inner tube 12 may be less than an outer diameter of the wire harness 5, so that the wire harness 5 may be press-fit into the passage 15 of the inner tube 12. As the inner surface 12a of the inner tube 12 grips an outer surface of the wire harness 5, the wire harness 5 may be tightly fitted into the passage 15 of the inner tube 12.

The inner tube 12 may have a plurality of first reflective ribs 13 facing an inner surface of the first outer tube 61, and a plurality of second reflective ribs 14 facing an inner surface of the second outer tube 62.

The plurality of first reflective ribs 13 may extend from an outer surface of the inner tube 12 in an annular shape, and each first reflective rib 13 may be tapered. As sound is reflected by the first reflective ribs 13, the sound may be dissipated or attenuated in the first radial spacing 63.

The plurality of second reflective ribs 14 may extend from the outer surface of the inner tube 12 in an annular shape, and each second reflective rib 14 may be tapered. As sound is reflected by the second reflective ribs 14, the sound may be dissipated or attenuated in the second radial spacing 64.

Figure 3:
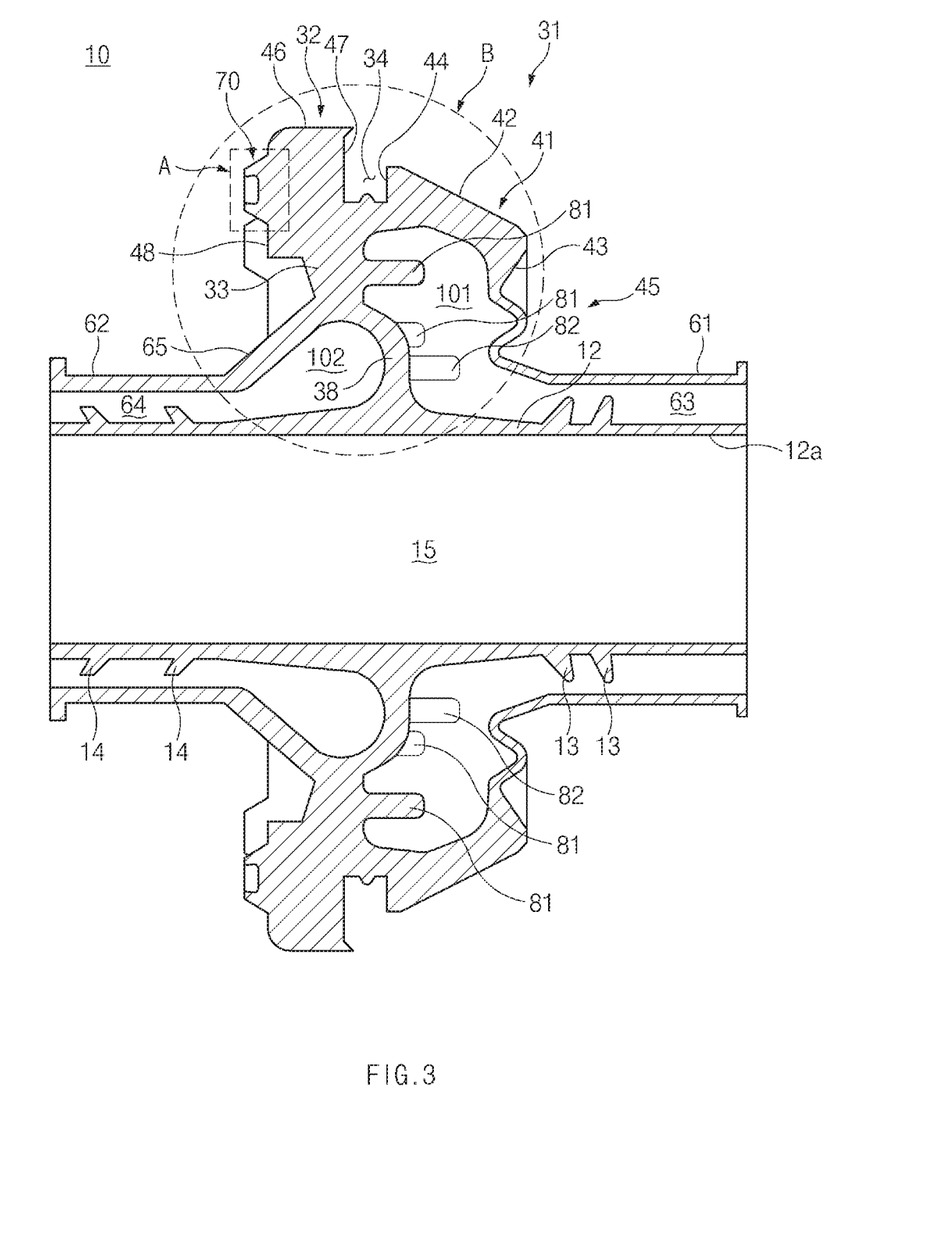
FIG. 3 illustrates a side cross-sectional view of a wire harness grommet according to an exemplary embodiment of the present disclosure.

As shown in FIG. 3, The wire harness grommet 10 may include a first cavity 101 communicating with the first area 91. The first cavity 101 may be defined by the inner wall 33, the connection web 38, the inner tube 12, the tapered wall 41, and the corrugated wall 45. The first cavity 101 may directly communicate with the first radial spacing 63, and the first radial spacing 63 may directly communicate with the first area 91, so that the first cavity 101 may communicate with the first area 91 through the first radial spacing 63. When the sound transmitted through the second body 32 and the inner wall 33 of the main body 11 is transmitted to the first cavity 101, the sound energy may be dissipated or attenuated by reflection and resonance in the first cavity 101.

The wire harness grommet 10 may include a second cavity 102 communicating with the second area 92. The second cavity 102 may be defined by the bulge portion 65, the connection web 38, and the inner tube 12. The second cavity 102 may directly communicate with the second radial spacing 64, and the second radial spacing 64 may directly communicate with the second area 92, so that the second cavity 102 may communicate with the second area 92 through the second radial spacing 64. When the sound transmitted from the second area 92 through the second radial spacing 64 is transmitted to the second cavity 102, the sound energy may be dissipated or attenuated by reflection and resonance in the second cavity 102.

Figure 5:
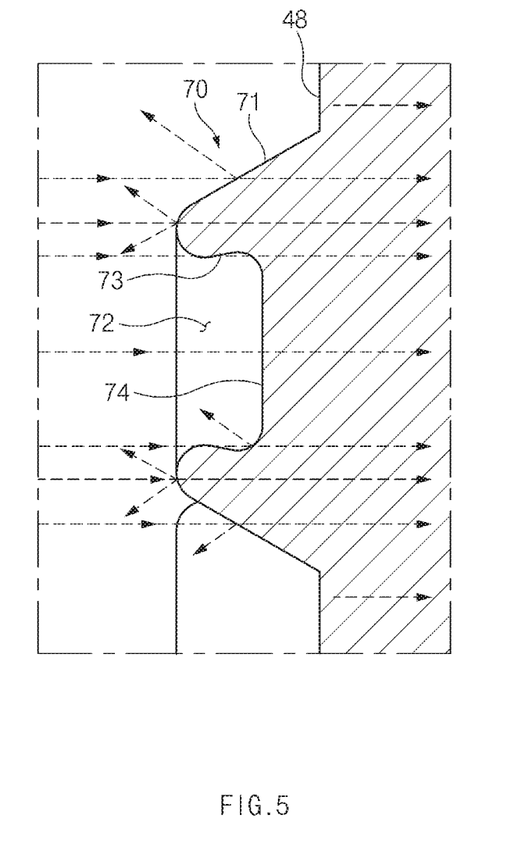
FIG. 5 illustrates an enlarged view of a portion indicated by arrow A of FIG. 3.

The main body 11 may have a plurality of sound insulation projections 70 exposed to the second area 92, and each sound insulation projection 70 may protrude from the second side surface 48 of the second body 32 toward the second area 92. The plurality of sound insulation projections 70 may be equidistantly spaced apart from each other along the circumference of the second side surface 48 of the second body 32. As shown in FIG. 5, each sound insulation projection 70 may include a reflective surface 71 extending along the outer periphery thereof, and a center recess 72 recessed in the center thereof. The reflective surface 71 may be tapered at a predetermined angle, and the center recess 72 may be defined by a side surface 73 and a bottom 74, and be open to the second area 92. When sound is incident from the second area 92 to the sound insulation projection 70, the sound may be reflected by the reflective surface 71 and the center recess 72 so that the sound to be transmitted through the second body 32 of the main body 11 may be attenuated. In other words, the plurality of sound insulation projections 70 may be a sound insulation mechanism provided on the second body 32.

Figure 6:
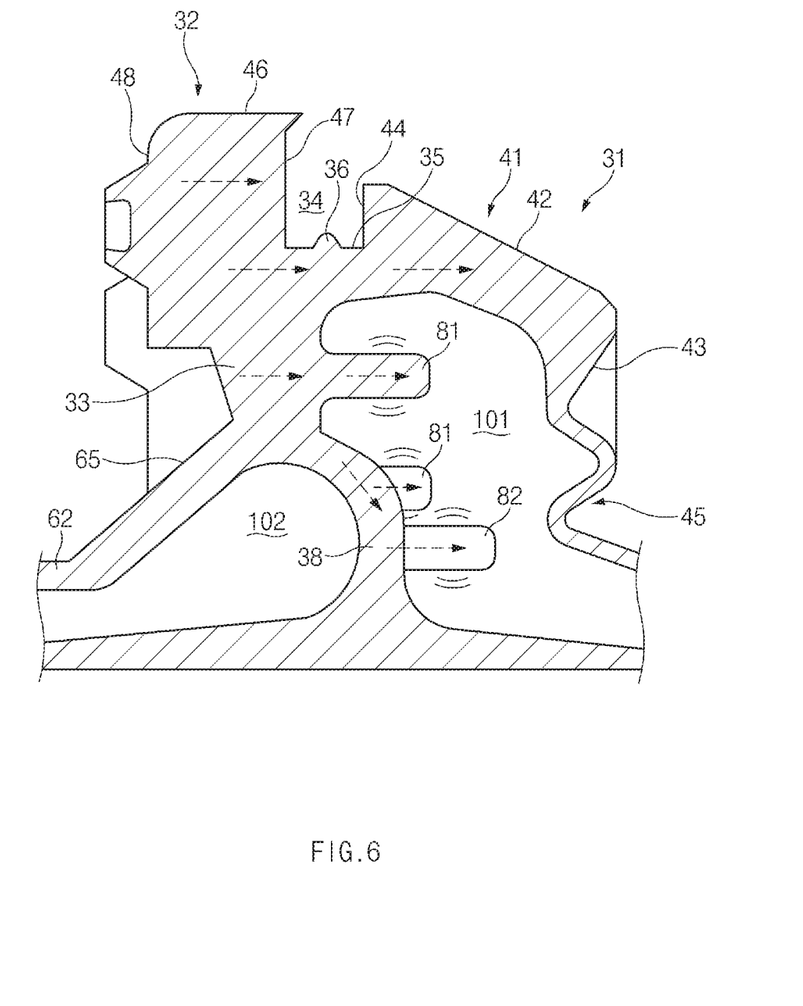
FIG. 6 illustrates an enlarged view of a portion indicated by arrow B of FIG. 3.

As illustrated in FIG. 6, the main body 11 may include a plurality of first fingers 81 vibrated by the sound transmitted through the second body 32 and the inner wall 33. The plurality of first fingers 81 may be arranged in a cantilevered manner in the first cavity 101. Each first finger 81 may extend from the inner wall 33 of the main body 11 toward the first cavity 101 in the cantilevered manner. That is, the first finger 81 may have a fixed end which is fixed to the inner wall 33 of the main body 11 and a free end which faces the first cavity 101. The plurality of first fingers 81 may be equidistantly spaced apart from each other along the circumference of the inner wall 33 of the main body 11. When sound is transmitted to the first fingers 81 through the second body 32 and the inner wall 33, the first fingers 81 may be flexed upwardly and/or downwardly by the transmitted sound so that the first fingers 81 may be vibrated. Thus, the sound energy may be dissipated or attenuated by thermal loss caused by the vibrations of the first fingers 81. For example, the plurality of first fingers 81 may be appropriately designed, e.g., to have a gap between the first fingers 81, an adequate size (length, diameter, etc.) of each first finger 81, and the like, so as to be vibrated by the transmitted sound.

In addition, the main body 11 may include a plurality of second fingers 82 vibrated by the sound transmitted through the connection web 38. The plurality of second fingers 82 may be arranged in a cantilevered manner in the first cavity 101. Each second finger 82 may extend from the connection web 38 toward the first cavity 101 in the cantilevered manner. That is, the second finger 82 may have a fixed end which is fixed to the connection web 38, and a free end which is in the first cavity 101. The plurality of second fingers 82 may be equidistantly spaced apart from each other along the circumference of the connection web 38. When sound is transmitted to the second fingers 82 through the connection web 38, the second fingers 82 may be flexed upwardly and/or downwardly by the transmitted sound so that the second fingers 82 may be vibrated. Thus, the sound energy may be dissipated or attenuated by thermal loss caused by the vibrations of the second fingers 82. For example, the plurality of second fingers 82 may be appropriately designed, e.g., to have a gap between the second fingers 82, an adequate size (length, diameter, etc.) of each second finger 82, and the like, so as to be vibrated by the transmitted sound.

As the plurality of first fingers 81 and the plurality of second fingers 82 are arranged in the cantilevered manner in the first cavity 101, the sound energy may be converted into vibration energy, and the converted vibration energy may be converted into thermal energy so that the sound energy may be dissipated or attenuated. Thus, the plurality of first fingers 81, the plurality of second fingers 82, and the first cavity 101 may form a sound absorbing mechanism.

Figure 7:
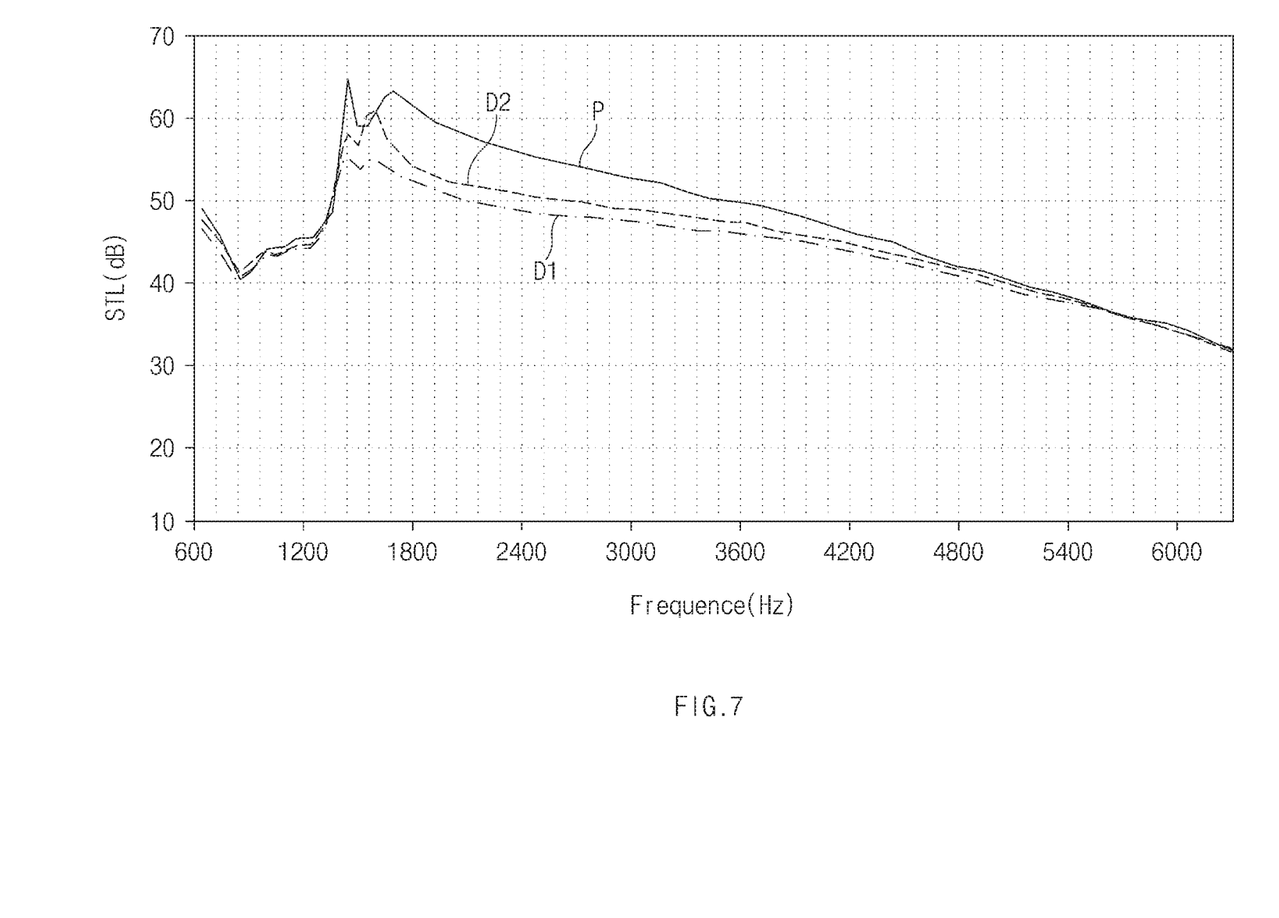
FIG. 7 illustrates a graph of sound transmission loss (STL) to frequency test results of wire harness grommets according to inventive and comparative examples.

FIG. 7 illustrates a graph of sound simulation results of a wire harness grommet P according to an inventive example, a wire harness grommet D1 according to comparative example 1, and a wire harness grommet D2 according to comparative example 2. The wire harness grommet P according to the inventive example may have a structure including sound insulation projections, first fingers, and second fingers. The wire harness grommet D1 according to comparative example 1 may have a structure from which the sound insulation projections, the first fingers, and the second fingers are removed. The wire harness grommet D2 according to comparative example 2 may have a structure from which the sound insulation projections, the first fingers, and the second fingers are removed, and in which some walls are partially thick.

As illustrated in FIG. 7, it can be seen that the wire harness grommet P according to the inventive example show improved sound transmission loss (STL) compared to the wire harness grommet D1 according to comparative example 1 and the wire harness grommet D2 according to comparative example 2.

As the plurality of sound insulation projections 70 are provided on the second body 32 facing the second area 92, the sound moving toward the first area 91 may be dissipated or attenuated in the second body 32, so that the plurality of sound insulation projections 70 may primarily increase STL (that is, a transmission coefficient may primarily be reduced). As the sound transmitted through the second body 32 vibrates the plurality of first fingers 81 and the plurality of second fingers 82 in the first cavity 101, the sound moving toward the first area 91 may be absorbed in the first cavity 101, so that the plurality of first fingers 81 and the plurality of second fingers 82 may secondarily increase STL (that is, the transmission coefficient may secondarily be reduced).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wire harness grommet, comprising:
   a main body including a first body, a second body connected to the first body, and an inner wall located between the first body and the second body;
   an inner tube disposed in a center of the main body wherein the inner tube is configured to receive a wire harness;
   a plurality of sound insulation projections on the main body, wherein each sound insulation projection has a tapered reflective surface; and
   a plurality of first fingers extending from the inner wall in a cantilevered manner.

2. The wire harness grommet according to claim 1, wherein:
   the main body has a groove fitted with a hole of a panel;
   the panel is divided into a first area and a second area;
   the first body faces the first area and the second body faces the second area; and
   the sound insulation projections are exposed to the second area.

3. The wire harness grommet according to claim 2, further comprising:
   a first cavity configured to communicate with the first area; and
   a second cavity configured to communicate with the second area.

4. The wire harness grommet according to claim 3, wherein the inner wall is connected to the inner tube through a connection web.

5. The wire harness grommet according to claim 4, further comprising a plurality of second fingers extending from the connection web toward the first cavity in a cantilevered manner.

6. The wire harness grommet according to claim 3, further comprising a first outer tube extending from the first body, wherein the first outer tube is spaced apart from the inner tube in a radial direction so that a first radial spacing is defined between the first outer tube and the inner tube, and the first cavity is configured to directly communicate with the first radial spacing.

7. The wire harness grommet according to claim 3, further comprising a second outer tube extending from the second body, wherein the second outer tube is spaced apart from the inner tube in a radial direction so that a second radial spacing is defined between the second outer tube and the inner tube, and the second cavity is configured to directly communicate with the second radial spacing.

8. The wire harness grommet according to claim 2, wherein the first body has a tapered wall facing the first area.

9. A wire harness grommet, comprising:
   a main body including a first body, a second body connected to the first body, and an inner wall located between the first body and the second body;
   an inner tube disposed in a center of the main body and having a passage;
   sound insulation projections on a side surface of the second body, the side surface facing away from the inner wall;
   a first cavity partially defined by the inner wall and the inner tube; and
   a plurality of first fingers arranged in a cantilevered manner in the first cavity, wherein each first finger has a first end and a second end opposite the first end, and wherein the first end is fixed to the inner wall and the second end is in the first cavity.

10. The wire harness grommet according to claim 9, further comprising a wire harness, wherein an inner diameter of the passage is less than an outer diameter of the wire harness, and wherein the wire harness is press-fit into the passage.

11. The wire harness grommet according to claim 9, wherein each sound insulation projection has a tapered reflective surface.

12. The wire harness grommet according to claim 9, wherein the sound insulation projections are equidistantly spaced apart from each other along a circumference of the side surface of the second body.

13. The wire harness grommet according to claim 9, further comprising:
   a connection web connected to the inner wall and the inner tube; and
   a plurality of second fingers arranged in a cantilevered manner in the first cavity, wherein each second finger has a first end and a second end opposite the first end, and wherein the first end is fixed to the connection web and the second end is in the first cavity.

14. The wire harness grommet according to claim 13, further comprising a second cavity partially defined by the inner tube and the connection web.

15. The wire harness grommet according to claim 9, further comprising a panel, wherein the main body has a groove fitted with a hole of the panel.

16. The wire harness grommet according to claim 15, wherein the panel is divided into a first area and a second area, the first body faces the first area, and the second body faces the second area.

17. The wire harness grommet according to claim 16, wherein the sound insulation projections are exposed to the second area.

18. The wire harness grommet according to claim 9, wherein the wire harness grommet comprises a rubber material.

19. A wire harness grommet, comprising:
   a main body including a first body, a second body connected to the first body, and an inner wall located between the first body and the second body, wherein the main body has a groove fitted with a hole of a panel that is divided into a first area and a second area, the first body facing the first area and the second body facing the second area;
   an inner tube disposed in a center of the main body wherein the inner tube is configured to receive a wire harness;
   a plurality of sound insulation projections on the main body and exposed to the second area, wherein each sound insulation projection has a tapered reflective surface;
   a first cavity configured to communicate with the first area;
   a second cavity configured to communicate with the second area; and
   a plurality of first fingers extending from the inner wall toward the first cavity in a cantilevered manner.

20. The wire harness grommet according to claim 19, wherein the inner wall is connected to the inner tube through a connection web, the wire harness grommet further comprising a plurality of second fingers extending from the connection web toward the first cavity in a cantilevered manner.

\* \* \* \* \*

UNITED STATES PATENT AND TRADEMARK OFFICE
CERTIFICATE OF CORRECTION

PATENT NO. : 11,052,840 B2  
APPLICATION NO. : 16/882196  
DATED : July 6, 2021  
INVENTOR(S) : Sung Woo Cho It is certified that error appears in the above-identified patent and that said Letters Patent is hereby corrected as shown below:

On the Title Page

Item (73); Line 1, delete "Corooration" insert --Corporation--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*